June 2, 1936.  J. E. NEVILLE  2,042,728
ANIMAL TRAP
Filed May 7, 1935  2 Sheets-Sheet 1

Inventor
J. E. Neville
By Clarence A. O'Brien
Attorney

June 2, 1936.　　　　J. E. NEVILLE　　　　2,042,728
ANIMAL TRAP
Filed May 7, 1935　　　　2 Sheets-Sheet 2
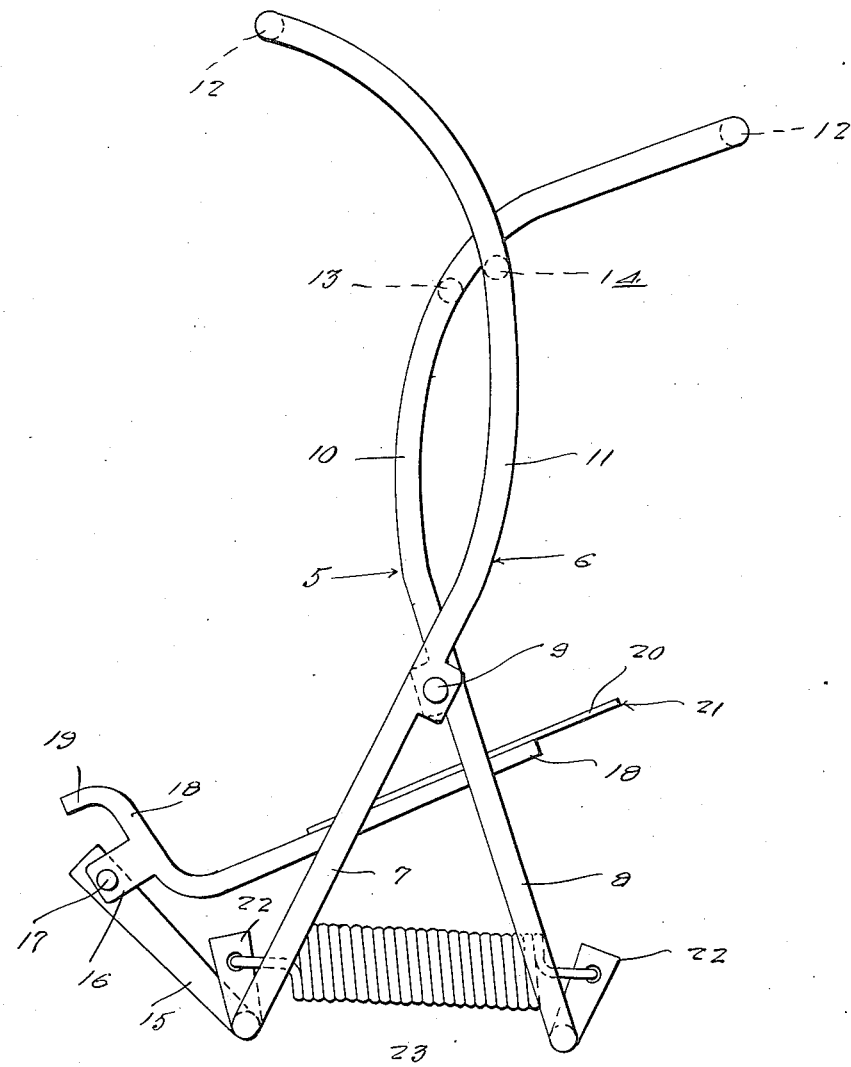
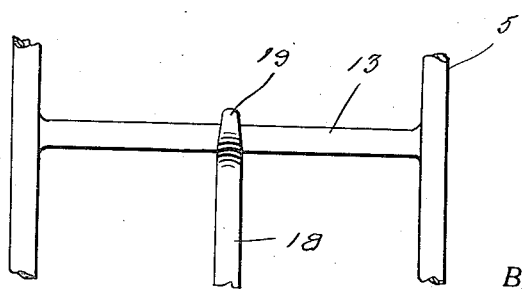
Inventor
J. E. Neville
By Clarence A. O'Brien
Attorney Patented June 2, 1936

2,042,728

UNITED STATES PATENT OFFICE 2,042,728

ANIMAL TRAP

Joseph E. Neville, Deer Lodge, Mont.

Application May 7, 1935, Serial No. 20,263

3 Claims. (Cl. 43—90)

This invention relates to a trap expressly designed for trapping relatively small animals such as rats, gophers, beavers, minks and similar rodents, and it has more specific reference to the manually set automatically operable animal tripped type.

Needless to say, I am aware that there are numerous types of traps wherein the animals participate in setting the trap off through the instrumentality of a weight actuated latch plate incorporated in a duplex jaw assembly. Many of these traps, such as I am familiar with are such that the jaws literally crush the animal or fail to successfully inflict the necessary blow to destroy the life of the creature. It has been observed that muskrats caught in these old-style traps frequently chew off their feet and get away in a crippled condition. Frequently, when a live rat is trapped in such type traps referred to it is attacked by other rats with the result that the hide which would otherwise be successfully utilized is virtually ruined.

It is not my intention, however, to more than touch upon this subject briefly, for what I have attempted to do is to provide a structurally different and an appreciably refined trap of the pincers type characterized by a unique jaw assembly susceptible of embracing the body of the victim in such a manner as to not only grapple and retain him but to at the same time develop the necessary impact or blow calculated to squeeze the life out of said victim in a humane manner, whereby to promote results mutually satisfactory to all concerned.

The particular structural details selected and mechanically coordinated to accomplish the results sought will become more readily apparent from the following description and accompanying illustrative drawings.

In these drawings, pictorial in nature, like numerals are employed to designate like parts throughout the views, in which:

Figure 3 is a similar view showing the trap sprung with the jaws interfitted in their closing positions.

Figure 4 is a detail fragmentary view illustrating the catch or latch arrangement.

Figure 1:
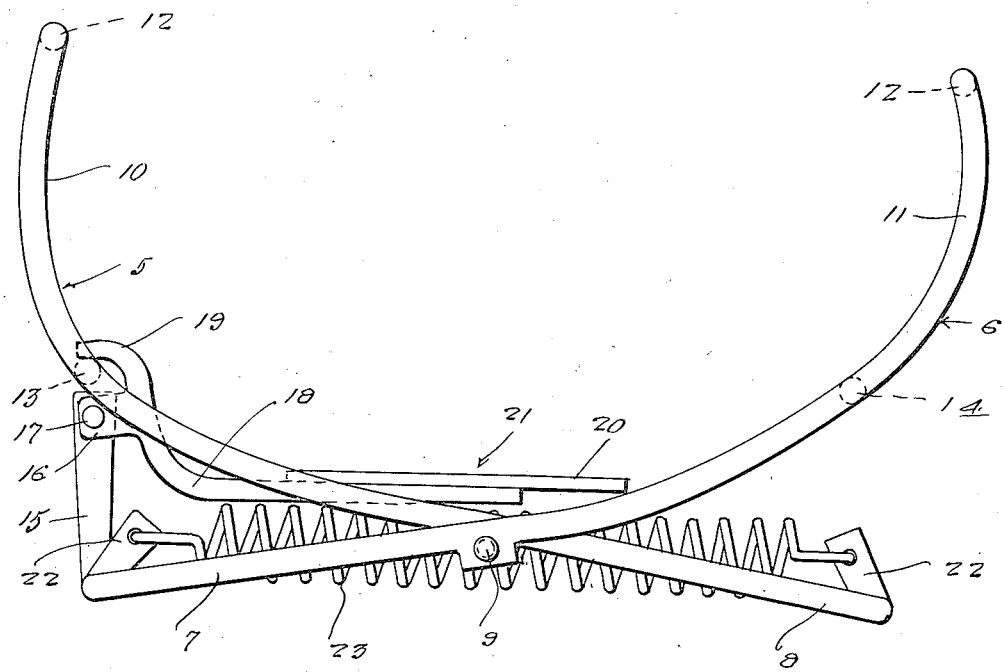
Figure 1 is an elevational view with the grappling jaws spread apart, that is, swung to open position which is the set position for the improved trap.
Figure 2:
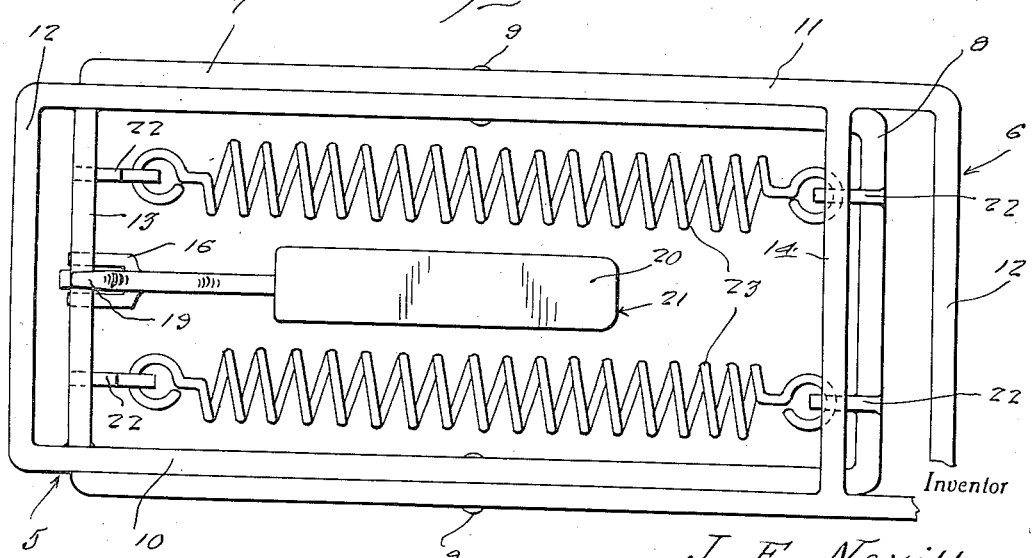
Figure 2 is a top plan view of the arrangement depicted in Figure 1.

Referring now to the preferred embodiment of the invention it will be observed that the double acting frame structure embodies a pair of substantially duplicate companion frames 5 and 6. The lower end portions of the frames denoted by the numerals 7 and 8 are joined together in intersecting arrangement through the instrumentality of pivot pins 9 and these portions 7 and 8 form the base part of the structure. The curved grappling end portions of the frames denoted by the numerals 10 and 11 form the pincers type jaws for satisfactorily embracing the victim. Incidentally the sections 5 and 6 are such as to allow the smaller section 5 to feed through the section 6 when the jaws are closed as illustrated in Figure 3. The end portions 12 of the jaws are promarily connecting elements but have the additional function of handles to facilitate setting the trap. The rounds or cross-pieces 13 and 14 are not only braces but the one indicated at 13 is in effect a keeper element. In connection with this part I would call attention to the numeral 15 which designates a standard or upright to which the ears 16 are pivotally connected as indicated at 17, said ears being formed as a part of the trip or latch arm 18. The free end portion of the arm is formed into a hook 19 which is engageable with the keeper element 13. The opposite end of the arm carries a trip plate 20 of appropriate dimensions and shape. These features together form the so-called trigger unit 21. This unit is centrally located between the base portions of the frames as illustrated in Figure 2. It will be observed that the end bars of the base portions 7 and 8 of the units 5 and 6 are provided with upstanding lugs 22 which serve as anchoring elements for the end portions of the coiled springs 23. There are two of these springs and they are located in spaced parallelism within the confines of the base portions 7 and 8 and are opposite the outer side of the trigger unit 21. This provides a compact and consolidated assemblage which is well balanced and quite sensitive in action. When the trap is set as shown in Figure 1 the elevated trip plate 20 is disposed above the pivotal connection between the two frame sections 5 and 6. The latch 19 thereon is engaged with the keeper 13 and this holds the jaws 10 and 11 spread apart in readiness to grapple or embrace the animal as he passes over and treads upon the treadle or plate 20.

Exercising what I believe to be a requisite degree of foresight I have evolved and produced a well-balanced and sensitive trap which because of its shape and special coaction of parts is calculated to accomplish the desired results in a humane and yet reliable manner. It is submitted that a pincers type animal grappling trap is a well directed advance in this particular line of endeavor not only because of its feasible and dependable activity but because of the safety features which are invoked in expediting setting of the trap in the first instance by the trapper.

Structurally and briefly visualized the trap is characterized by a pair of substantially duplicate companion rectangular frames 5 and 6 pivotally connected together in intersecting relation between their ends so that the end portions 7 and 8 serve as the base part and the portions 10 and 11 as the embracing jaws. The portions 7 and 8 forming the collapsible base also serve to accommodate the spaced parallel springs 23 properly anchored thereto and disposed on opposite sides of the centralized trigger or animal actuated trip unit 21. These parts have been carefully selected and conjointly arranged to promote expeditious and reliable results.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. In a pincers type animal trap of the class described, a pair of substantially duplicate wire rod frames, said frames being pivotally joined together intermediate their ends, the end portions at one end forming a collapsible base sections, the opposite end portions being curved and shaped to provide animal embracing jaws, a pair of spaced parallel coiled contraction springs having their opposite ends anchored to the end portions of the base sections, an upright carried by one of the base sections, a trip arm pivoted on said upright and including a latch forming hook, an animal actuated trigger plate on the opposite end of the arm, said arm and plate being located centrally with respect to the coiled springs, one of said frames being provided with a cross-piece forming a keeper with which said latch hook is releasably engageable.

2. In a pincers type animal trap of the class described, a pair of substantially duplicate longitudinally elongated frames, each frame including spaced parallel side bars and transverse connecting end bars, said frames having their respective side bars pivotally joined together intermediate their ends; the portions of the frames on one side of the pivotal joints serving to form collapsible base sections, the portions of the frames on the opposite side of said pivoted joints being gradually and longitudinally bowed to provide a pair of animal embracing jaws, spring means cooperable with the companion base portions, and an animal actuated trip means cooperable with said frame.

3. As a new article of manufacture usable as a component part of an animal trap of the class described, a longitudinally elongated frame including spaced parallel longitudinal members joined together at their opposite ends by transverse end members, said frame having one end longitudinally bowed to function as an animal-embracing jaw, an upright secured to and rising at right angles from the opposite end of the frame, a trip arm pivoted at one end on said upright and including a latch-forming hook arranged adjacent to said pivoted end, and an animal-actuated trigger plate fastened on the opposite swingable end of said trip arm.

JOSEPH E. NEVILLE.